United States Patent Office 2,765,251
Patented Oct. 2, 1956

2,765,251

LAMINATED STRUCTURES AND METHOD OF MAKING SAME

Lucille E. Williams, Wilmington, Del., assignor to E. I. du Pont de Nemours and Company, Wilmington, Del., a corporation of Delaware No Drawing. Application August 31, 1954,
Serial No. 453,440

11 Claims. (Cl. 154—139)

This invention relates to laminated structures, more particularly to such structures comprising laminae of a hydrophobic layer adhered to a polymeric linear terephthalate ester layer by means of a copolyester layer, and processes of making such structures.

This application is a continuation-in-part of my co-pending application Serial No. 419,103 filed March 26, 1954.

U. S. Patent 2,465,319 describes a process for the preparation of highly polymerized linear esters of terephthalic acid and glycols of the series $HO(CH_2)_nOH$, where $n$ is a whole number within the range of 2 to 10. These polymeric esters may be spun into filaments and then woven into textile fabrics. They may be cast from organic solution to prepare unsupported films. A hot plastic mass of the polymeric linear terephthalate esters may be formed into unsupported films by passing the mass between smooth hot calender rolls or melt casting from a hopper.

For certain applications it is desirable to laminate a film or fabric prepared from the polyester described in U. S. Patent 2,465,319 to itself in a variety of constructions, such as, e. g. film to film, fabric to fabric and fabric to film. Also it is desirable to adhere the polyethylene terephthalate film or fabric to chemically dissimilar hydrophobic surfaces such as nylon, glass, polyacrylonitrile, vinylidene polymers, such as, e. g., polyvinylidene chloride and vinyl chloride polymers as well as copolymers and various metals. Conventional adhesives do not adhere to the polyethylene terephthalate.

Throughout the specification and appended claims the term "polymeric linear terephthalate ester" refers to an oriented highly polymerized linear ester of terephthalic acid and a glycol of the series $HO(CH_2)_nOH$, where $n$ is a whole number within the range of 2 to 10.

It is an object of this invention to provide laminated structures involving at least one layer of a polymeric linear terephthalate ester and another hydrophobic layer with an intermediate layer of a copolyester defined hereinafter. Another object is the provision of a process for uniting a polymeric linear terephthalate ester to itself or other hydrophobic surfaces by means of a copolyester adhesive composition.

The objects of this invention are accomplished by laminating a sheet of polymeric linear terephthalate to itself or chemically dissimilar hydrophobic surfaces by means of a composition comprising a copolyester of at least one acyclic dicarboxylic acid and at least one symmetrical aromatic dicarboxylic acid with a polymethylene glycol of the formula $HO(CH_2)_nOH$, where $n$ is a whole number from 2 to 6 inclusive.

The polymeric linear terephthalate ester referred to in the following specific examples may be prepared in accordance with the teaching set forth in U. S. Patent 2,465,319 issued March 22, 1949, to J. R. Whinfield et al.

The copolyesters employed for bonding to the polymeric linear terephthalate are similar to those prepared by copolymerizing under melt polymerization conditions, within certain composition limits hereinafter set forth, at least one acyclic dicarboxylic acid of the formula $$HOOC-CH_2XCH_2-COOH$$

wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon carbon atoms being saturated and containing a total of not more than three hydrocarbon carbon atoms as side chain substituents, with at least one symmetrical aromatic dibasic acid from the group consisting of terephthalic acid, bibenzoic acid, ethylene bis p-oxybenzoic acid, tetramethylene bis p-oxybenzoic acid and 2,6-naphthalic acid and with a polymethylene glycol of the formula $$HO(CH_2)_nOH$$

wherein $n$ is a whole number from 2 to 6 inclusive.

To make the copolyesters for the purpose of this invention, it is necessary that the aromatic acid comprise at least 30% and not more than 90% by weight of the total acid component of final polymer. A preferred range is 55–80% of the aromatic acid. It is a simple matter to obtain any desired ratio of acid components in any one copolyester. The acids will be present in the final polymer in the same ratio as they were present in the initial reactants, provided an excess of glycol is used. It should be understood, of course, that many combinations of these aliphatic and aromatic acids may be used. Thus, two or more aliphatic and/or two or more aromatic acids may be used to form the copolyester. It is also to be understood that the ester-forming derivatives of these acids can be used in place of, and are the full equivalents of, the acids described above, as is generally the case in the manufacture of linear polyesters. The copolyesters per se are the invention of M. D. Snyder and are disclosed and claimed in U. S. Patent 2,623,033, issued December 23 1952.

The melt mixtures of polyesters and copolyesters described in U. S. Patent 2,623,031, issued December 23, 1952, to M. D. Snyder, may also be used to adhere to a surface of the polymeric linear terephthalate ester. The melt-blends are prepared by first preparing the copolyester described above and thereafter melt-blending the copolyester thus formed with an aromatic polyester prepared by melt polymerizing a symmetrical aromatic dibasic acid, from the group consisting of terephthalic acid, bibenzoic acid, tetramethylene bis p-oxybenzoic acid, and 2,6-naphthalic acid, and a polymethylene glycol of the formula $HO(CH_2)_nOH$, $n$ being a whole number from 2 to 6 inclusive. Preferably, the same aromatic dibasic acid used in the copolyester is used in the polyester. As in the case of the copolyester, the aromatic acid component of the melt-blend of the polyester and copolyester should be at least 30% and not more than 90% on a weight basis.

The following specific examples are given by the way of illustration and not limitation. The parts and percentage figures throughout the specification and claims are expressed on a weight basis.

*Example I*

A pellicle of polymeric linear terephthalate, 1 mil thick, was coated on one side with a thin layer of the following adhesive composition:

|  | Parts by weight |
|---|---|
| Copolyester of 60 parts of ethylene terephthalate and 40 parts of ethylene sebacate | 16.7 |
| Chloroform | 83.3 |
|  | 100.0 |

Sufficient composition was applied to deposit about .5 ounce per square yard of dry coating. After the solvent was evaporated from the adhesive layer, the dry adhesive coating was doubled upon itself to form two plies of film with adhesive sandwiched between. The doubled film was then hot pressed at 160–190° F. for about 10 minutes at 500 pounds per square inch. After cooling to room temperature the adhesion of the two plies of film was found to be 7.5 pounds per one inch strip.

*Example II*

A woven polyethylene terephthalate fabric weighing about 3.0 ounces per square yard, having a thread count of 112 x 88 (warp x filler—threads/ inch) was coated on one side with the adhesive composition of Example I and then heated to evaporate the solvent. The dry adhesive film was about 1 mil thick. A pellicle of polyethylene terephthalate .5 mil thick was superposed over the dry adhesive on the woven fabric and the assembly passed between pressure rolls heated to about 300° F. After cooling to room temperature the laminated assembly was subjected to the standard adhesion test by fastening one inch strips of unlaminated portions of the assembly in the opposite jaws of a Scott tester and then measuring the pull required to separate the plies at a uniform rate. The .5 mil film one inch wide broke at 13.0 pounds pull without any separation of the laminated portion of the assembly.

*Example III*

A two mil thick film of a copolyester of 55 parts of ethylene terephthalate and 45 parts ethylene sebacate was sandwiched between a woven fabric of polyethylene terephthalate such as described in Example II and a pellicle of polyethylene terephthalate .5 mil thick. The assembly was pressed between polished metal plates heated to about 160–190° F. for 10 minutes.

The laminated assembly had the following physical properties:

| | |
|---|---|
| Thickness | 6 mils. |
| Adhesion of laminae, 1" strip | 12.0 lbs. |
| Wyzenbeek abrasion resistance (using 240 J abrading surface) | 4000 strokes. |
| Tensile strength | 143 lbs. |
| Tensile strength, after 48 hour immersion in sulfuric acid | 132 lbs. |
| Tensile strength, after 48 hour immersion in benzene | 135 lbs. |
| Tensile strength, after 48 hour immersion in gasoline | 132 lbs. |
| Tensile strength, after heating at 250° F. for 7 days | 115 lbs. |
| Dielectric strength | 947 volts/mil. |
| Hydrostatic resistance, film side next to water | 228–260 lbs. |
| Heat resistance, after 30 day exposure at 250° F. | No deterioration. |
| Resistance to cracking on sharp fold: | |
| Creased in warp direction | No cracking at minus 100° F. |
| Creased in filler direction | No cracking at minus 100° F. |
| Scrub test, dry | No cracking after 500 cycles. |
| Scrub test, after 24 hour immersion in a solvent mixture of: Diisobutylene, 60%; benzene, 5%; toluene, 20%; xylene, 15%. | No cracking after 500 cycles. |
| Schiltknecht flex | 37,500 flexes. |
| After 48 hour exposure to ozone | No cracking or degradation. |
| Benzene vapor permeability | None. |
| High octane gasoline vapor permeability | None. |
| Benzene liquid permeability | None. |
| High octane gasoline liquid permeability | 2. |

The Wyzenbeek abrasion resistance test was carried out in accordance with Method 5304 of Federal Specification CCC-T-191b Textile Test Methods dated May 15, 1951.

The tensile strength tests were carried out on a Scott tester using a 50 pound weight on side arm.

The dielectric strength test was carried out in accordance with the ASTM D149-44 short time test in air, ¼" electrode with 60 cycle alternating current.

The hydrostatic test was carried out in accordance with Mullen ASTM D751-46T test.

The scrub test was carried out on an apparatus similar to that illustrated in Automotive Industries 49, p. 1262-6.

The Schiltknecht flex test was carried out in accordance with test and apparatus described in Bulletin #105, published by Alfred Suter, 200 Fifth Avenue, New York, N. Y.

The benzene vapor and liquid permeability tests were carried out by placing 150 g. of benzene in a pint Mason jar. The test specimen of the laminated material was used as the sealing gasket for a two piece screw top lid with the linear polyethylene terephthalate surface toward the liquid. For the vapor permeability test the jars remained upright and for the liquid permeability test the jars were turned upside down so that the liquid contacted the test specimen. The numerical values reported above are the grams weight of the loss of liquid after 7 days at room temperature. The test is similar to the procedure described in ASTM D814-46T.

*Example IV*

A two mil thick film of a copolyester of 60 parts of ethylene terephthalate and 40 parts of ethylene sebacate was sandwiched between a layer of ECC–11–112 "Fiberglas" and a layer of ½ mil thick pellicle of polyethylene terephthalate. The assembly was subjected to a pressure of about 150 pounds per square inch at 307° F. for 10 minutes. The final product had a thickness of 4 mils and was flexible. The dielectric strength was as high as 2000 volts per mil thickness. In an attempt to determine the bond strength of the laminate the glass fabric tore before any stripping occurred.

*Example V*

A two mil thick film of a copolyester of 60 parts of ethylene terephthalate and 40 parts of ethylene sebacate was superposed over a woven polyethylene terephthalate fabric such as described in Example II. The assembly was subjected to a pressure of about 500 pounds per square inch at 307° F. for 10 minutes. The two plies were firmly united together to form a composite assembly.

*Example VI*

A 1 mil thick pellicle of polyethylene terephthalate was coated on one side with the following composition:

| | Parts by weight |
|---|---|
| Copolyester of about 65 parts of ethylene terephthalate and 35 parts of ethylene sebacate | 22.5 |
| Heat reactive para tertiary butyl phenol/formaldehyde resin | 7.5 |
| Acetone | 70.0 |
| | 100.0 |

A good commercial example of a para tertiary butyl phenol/formaldehyde resin given above is "Beckacite" 1001, available on the open market from Reichhold Chemicals, Inc.

The volatile solvent was evaporated from the pellicle and the dried product was capable of being wound up in roll form and stored at room temperature. The above coating composition firmly adhered to the pellicle of polyethylene terephthalate and was capable of adhering to other surfaces by the application of heat and pressure. In the standard adhesion test the film tore and stretched before the bond of adhesive was broken.

*Example VII*

A hot melt of a copolyester of 30 parts of ethylene terephthalate and 70 parts of ethylene sebacate was spread uniformly on a thin film of polyethylene terephthalate. The coated side of the film was immediately double upon itself and the assembly was then hand pressed with a sealing iron at about 194° F. Excellent adhesion was obtained between the two plies of the polyethylene terephthalate film.

*Example VIII*

A two mil thick film of a copolyester of 60 parts of ethylene terephthalate and 40 parts of ethylene sebacate was sandwiched between a one mil thick film of polyethylene terephthalate and a nylon parachute fabric weighing about 1.8 ounces per square yard. The assembly was subjected to a pressure of about 500 pounds per square inch and a temperature of about 307° F. for 10 minutes.

After cooling to room temperature the adhesion of the polyethylene terephthalate to the nylon fabric was found to be 4.0 pounds per one inch strip.

*Example IX*

Example VIII was repeated with fabric woven from yarns composed of polyacrylonitrile in place of the nylon fabric.

The adhesion of the polyethylene terephthalate film to the polyacrylonitrile fabric was 4.0 pounds per one inch strip.

Examples X to XV

A one mil thick preformed film of a copolymer comprising 60 parts of ethylene terephthalate and 40 parts of ethylene sebacate was interposed between a three mil thick film of polyethylene terephthalate and another lamina, as indicated in the table below. The assemblies were preheated for 1.5 minutes at 302° F. and then subjected to a pressure of about 3000 pounds per square inch for an additional one minute at the same temperature. The laminates were removed from the press and allowed to cool to room temperature. The bond strengths of the laminates were tested and the following results were obtained:

| Example | Polyethylene Terephthalate Film 3 Mils Thick Adhered to Various Laminae by Means of an Interposed Preformed Film 1 Mil Thick of a Copolyester of 60 Parts of Ethylene Terephthalate and 40 Parts of Ethylene Sebacate. | Bond Strength of Laminate-Strip 1″ Wide, Pounds Pull Required to Separate the Laminae |
|---|---|---|
| X | Aluminum Sheet | 6.6 |
| XI | Copper Sheet | 6.6 |
| XII | Bronze Sheet | 3.5 |
| XIII | Tin Sheet | 7.6 |
| XIV | Stainless Steel Sheet | 5.8 |
| XV | Glass Sheet [1] | 6.6 |

[1] Only slight hand pressure applied after heating the assembly for 2.5 minutes at 302° F.

Example XVI

A cotton fabric running 2.40 yards per pound per 60 inch width was coated with 13.0 ounces per square yard of a plastisol composition of the following approximate formula:

| | Parts by weight |
|---|---|
| Polyvinyl chloride powder | 49.4 |
| Dioctyl phthalate | 30.6 |
| Pigments and filler | 20.0 |
| | 100.0 |

The polyvinyl chloride powder, pigments and filler were dispersed in the dioctyl phthalate at room temperature to form a paste-like composition, known as a plastisol. The polyvinyl chloride powder is dispersed as undissolved particles. The plastisol was spread on the fabric by means of a doctor knife, in a single coat, after which it was passed through a heat zone (325–375° F.) which fused the plastisol to a tough coating having high mechanical strength when cooled to room temperature. A preformed film of a copolyester of 60 parts of ethylene terephthalate and 40 parts ethylene sebacate 5 mils thick was sandwiched between the polyvinyl chloride coating and a preformed film of polymeric linear terephthalate ester 5 mils thick. The assembly was preheated for one minute at 300° F. before subjecting to a pressure of 600 p. s. i. for a period of one minute at 300° F.

The adhesion of the polymeric linear terephthalate ester film to the assembly was 12.0 lbs. per one inch strip. The product was glossy and had the appearance of patent leather. The glossy surface was scuff resistant. It was adaptable for footwear, ladies' handbags, belts, millinery and novelty products.

The adhesion tests employed in all the examples were carried out in accordance with the procedure described in Method 5950 of Federal Specification CCC–T–191b dated May 15, 1951, and entitled "Textile Test Methods."

The copolyesters may also be used to adhere the polymeric linear terephthalate ester to the non-woven webs described in U. S. Patent 2,676,128, issued April 20, 1954, to J. A. Piccard and copending applications S. N. 267,911, now abandoned, and S. N. 267,912, filed January 23, 1952, and S. N. 232,247, filed June 18, 1951, by E. A. Rodman, now Patent No. 2,725,309.

A plurality of plies of alternating layers of the polymeric linear terephthalate and copolyester may be subjected to heat and pressure to make rigid and semi-rigid laminates.

Due to the high strength of the polymeric linear terephthalate, films as thin as .25 mil are satisfactory for the purpose of this invention. There are no particular limits for the thickness of the polymeric linear terephthalate films in carrying out this invention. Economic considerations will usually control the upper limit of thickness of the polymeric linear terephthalate films. Likewise there are no particular limits on the weight or construction of the polymeric linear terephthalate fabrics in carrying out this invention. The polymeric linear terephthalate fabric may be woven or non-woven.

In place of the polyethylene terephthalate used in the specific examples, it is to be understood that the highly polymerized esters obtained by the reaction of terephthalic acid and polymethylene glycols having more than 2 but not more than 10 methylene groups may also be used in this invention; such as, e. g. trimethylene glycol, tetramethylene glycol, pentamethylene glycol, hexamethylene glycol, heptamethylene glycol, octamethylene glycol, nonamethylene glycol, and decamethylene glycol. The glycols having 2 to 4 methylene groups are preferred.

The phenol-aldehyde resin employed with the copolyester in the bonding layer of Example VI is preferably thermosetting or heat reactive, i. e., capable of hardening or curing when heated. The resin may be made by reacting any of the phenols with any of the aldehydes, preferably the aliphatic aldehydes. The phenol may be cresol, phenol, xylenol and resorcinol, as well as substituted phenols such as, e. g. para tertiary butyl phenol, para tertiary amyl phenol, para phenyl phenol, or para octyl phenol. The phenolic resins may be modified with drying oils, semi-drying oils, rosin and similar materials. Such resins are obtainable on the open market under the proprietary names of "Amberlite," "Bakelite," "Beckacite," "Catalin," "Durez," "Indur," "Resinox" and "Texolite." The heat reactive phenol-aldehyde resin may be present in the adhesive composition in amounts up to 50% of the weight of the copolyester.

The copolyester adhesive composition may also be used as an adherent surface coating to the polymeric linear terephthalate esters in film or fabric form, in which case it may be desirable to add coloring materials, such as pigments and dyes, to the surface coating. Such a coating may be a continuous overall coating or it may be used as a printing or stencil ink, in which case the coating is applied in the form of designs on only a portion of the surface to be coated. Furthermore, the adhesive composition may be employed as a coating for anchoring various moistureproofing coatings, e. g., polyvinyl chloride, polyvinylidene chloride and copolymers thereof, to polymeric linear terephthalate esters in film form.

In some cases, it may be desirable to add a plasticizer to the adhesive composition, and for this purpose the following materials may be employed; sebacic or phthalic diester of monobutyl ether of ethylene glycol, tricresyl phosphate, triphenyl phosphate, dioctyl phthalate, dibutyl phthalate and dibutyl sebacate.

The products of this invention have unusual resistance to both aromatic and aliphatic hydrocarbon liquids which make them particularly useful as carburetor and fuel pump diaphragms, gasoline hose interiors, printers' blankets, covering for electrical cables and gaskets requiring hydrocarbon resistance.

It is apparent that many widely different embodiments of this invention can be made without departing from the spirit and scope thereof and, therefore, it is not intended to be limited except as indicated in the appended claims.

I claim:

1. A laminated assembly comprising at least three layers, (1) the first of which consists of polymeric linear terephthalate ester, (2) as an intermediate layer a copolyester comprising (a) at least one polymethylene glycol ester of an acyclic dicarboxylic acid of the formula

where X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon carbon atoms being saturated and containing a total of not more than three hydrocarbon carbon atoms as side chain substituents; and (b) at least one polymethylene glycol ester of a symmetrical aromatic dibasic acid from the group consisting of terephthalic acid, dibenzoic acid, ethylene bis p-oxy-benzoic acid, tetramethylene bis p-oxy-benzoic acid and 2,6-naphthalic acid, the aromatic acid comprising from 30% to 90% by weight of the acid components of the copolyester, and the polymethylene glycol component of (a) and (b) having from 2 to 6 carbon atoms and (3) a third layer consisting of a hydrophobic layer selected from the group consisting of a polymeric linear terephthalate ester, polyacrylonitrile, vinylidene chloride polymer, vinyl chloride polymer and nylon.

2. The product of claim 1 in which the first mentioned polymeric linear terephthalate ester is in the form of a film.

3. The product of claim 1 in which the first mentioned polymeric linear terephthalate ester is in the form of a fabric.

4. The product of claim 1 in which the intermediate layer (2) also contains a heat reactive phenolaldehyde resin.

5. The product of claim 4 in which the intermediate layer (2) contains up to 50% of the weight of the copolyester.

6. The method of preparing laminated assemblies which comprises adhering the surface of a polymeric linear terephthalate ester to a copolyester, said copolyester comprising (a) at least one polymethylene glycol ester of an acyclic dicarboxylic acid of the formula

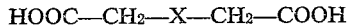

where X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon carbon atoms being saturated and containing a total of not more than three hydrocarbon carbon atoms as side chain substituents, and (b) at least one polymethylene glycol ester of a symmetrical aromatic dibasic acid from the group consisting of terephthalic acid, bibenzoic acid, ethylene bis p-oxy-benzoic acid, tetramethylene bis p-oxy-benzoic acid and 2,6-naphthalic acid, the aromatic acid comprising from 30% to 90% by weight of the acid components of the copolyester, and the polymethylene glycol component of (a) and (b) having from 2 to 6 carbon atoms, and adhering to said copolyester layer a hydrophobic layer selected from the group consisting of polymeric linear terephthalate ester, polyacrylonitrile, vinylidene chloride polymer, vinyl chloride polymer and nylon.

7. The method of claim 6 in which the first mentioned polymeric linear terephthalate ester is in the form of a film.

8. The method of claim 6 in which the first mentioned polymeric linear terephthalate ester is in the form of a fabric.

9. The method of claim 6 in which the copolymer is applied to the polymeric linear terephthalate ester surface in the form of a dispersion of the copolyester in an organic solvent.

10. The method of claim 6 in which the copolyester is applied to the polymeric linear terephthalate ester surface in the form of a hot melt.

11. The method which comprises adhering a polymeric linear terephthalate ester surface to another surface which comprises interposing a preformed film of the copolyester of claim 6 between the surface of said polymeric linear terephthalate ester and said other surface, and subjecting the assembly to heat and pressure, said other surface being a hydrophobic layer selected from the group consisting of polymeric linear terephthalate ester, polyacrylonitrile, vinylidene chloride polymer, vinyl chloride polymer and nylon.

References Cited in the file of this patent

UNITED STATES PATENTS

| | | |
|---|---|---|
| 2,623,031 | Snyder | Dec. 23, 1952 |
| 2,623,033 | Snyder | Dec. 23, 1952 |
| 2,673,826 | Ness | Mar. 30, 1954 |
| 2,676,128 | Piccard | Apr. 20, 1954 |